(12) United States Patent
Itoi et al.

(10) Patent No.: US 7,646,539 B2
(45) Date of Patent: Jan. 12, 2010

(54) OPTICAL DEVICE AND MANUFACTURING METHOD THEREOF

(75) Inventors: Kiyokazu Itoi, Kyoto (JP); Tetsushi Nishio, Kyoto (JP); Yutaka Harada, Kyoto (JP); Tomoko Komatsu, Kyoto (JP); Masashi Kuroda, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/401,904

(22) Filed: Mar. 11, 2009

(65) Prior Publication Data
US 2009/0237796 A1 Sep. 24, 2009

(30) Foreign Application Priority Data

Mar. 18, 2008 (JP) ............................ 2008-069734
Feb. 9, 2009 (JP) ............................ 2009-027068

(51) Int. Cl.
G02B 27/10 (2006.01)
G02B 7/02 (2006.01)
G03B 17/00 (2006.01)

(52) U.S. Cl. ...................... 359/619; 359/626; 359/811; 396/529; 257/432; 257/433; 257/678; 348/340; 438/64

(58) Field of Classification Search ................. 359/811, 359/819, 619–622, 626, 581; 257/432–434, 257/678; 438/64, 66, 68, 73, 75, 459; 427/162, 427/487; 348/340, 373
See application file for complete search history.

(56) References Cited

U.S. PATENT DOCUMENTS

| 6,788,377 | B1 * | 9/2004 | Ogawa et al. ............... 349/151 |
| 6,794,218 | B2 * | 9/2004 | Barton et al. ................. 438/73 |
| 7,074,638 | B2 * | 7/2006 | Maeda et al. ................. 438/75 |
| 7,227,236 | B1 * | 6/2007 | Lee et al. ..................... 257/433 |
| 7,411,230 | B2 * | 8/2008 | Maeda et al. ................. 257/225 |
| 7,521,335 | B2 * | 4/2009 | Yamanaka ................... 438/458 |
| 7,561,336 | B2 * | 7/2009 | Osaka et al. ................. 359/619 |
| 2005/0041134 | A1 | 2/2005 | Takayama |
| 2007/0117349 | A1 | 5/2007 | Komatsu et al. |
| 2008/0042227 | A1 | 2/2008 | Asano et al. |

FOREIGN PATENT DOCUMENTS

JP 2003-031782 1/2003

* cited by examiner

*Primary Examiner*—Loha Ben
(74) *Attorney, Agent, or Firm*—McDermott Will & Emery LLP

(57) ABSTRACT

An optical device includes a substrate, a plurality of optical elements formed in an element formation region of the substrate, a plurality of lenses formed over the element formation region so as to correspond to the plurality of optical elements, and a protective layer formed so as to cover the plurality of lenses. A holding member is formed on the protective layer in a region outside the element formation region. The holding member holds a bottom surface of a transparent member. A gap between the protective layer and the transparent member is filled with an adhesive.

15 Claims, 5 Drawing Sheets

OPTICAL DEVICE AND MANUFACTURING METHOD THEREOF

CROSS-REFERENCE TO RELATED APPLICATIONS

This application claims priority under 35 U.S.C. § 119(a) based on Japanese Patent Application No. 2008-069734 filed on Mar. 18, 2008 and Japanese Patent Application No. 2009-027068 filed on Feb. 9, 2009, the entire contents of which are hereby incorporated by reference.

BACKGROUND OF THE INVENTION

The present invention generally relates to an optical device and a manufacturing method thereof. More particularly, the present invention relates to an optical device used in, for example, a digital camera and a manufacturing method thereof.

Optical devices having a plurality of optical elements formed in a substrate and a plurality of lenses corresponding to the optical elements have been used in digital cameras and the like. In such optical devices, contamination of lenses is a critical problem since light enters an optical device through the lenses. A transparent member that covers the lenses is therefore provided to prevent contamination of the lenses. The top surface of the transparent member serves also as a reference plane for mounting the optical device.

In general, the plurality of lenses are covered by a protective layer having a low refractive index, and the transparent member is fixed onto the protective layer with an adhesive interposed therebetween (for example, see Japanese Patent Laid-Open Publication No. 2003-31782). With this structure, the transparent member can be easily fixed because the protective layer forms a flat surface over the lenses.

SUMMARY OF THE INVENTION

However, the transparent member fixed by a conventional method has its top surface tilted with respect to the lens surface. This problem occurs due to an uneven thickness of the adhesive for fixing the transparent member. If the transparent member is fixed over the protective layer in a tilted state, light does not enter a correct optical element, leading to poor image quality. Moreover, the top surface of the transparent member cannot be used as a reference plane of the optical device.

It is therefore an object of the present disclosure to implement a high image quality optical device whose transparent member is less likely to be tilted.

According to the present disclosure, an optical device includes a holding member formed on a protective layer for holding a transparent member.

More specifically, an optical device according to the present disclosure includes a substrate, a plurality of optical elements, a plurality of lenses, a protective layer, a holding member, a transparent member, and an adhesive. The plurality of optical elements are formed in an element formation region of the substrate. The plurality of lenses are formed over the element formation region so as to correspond to the plurality of optical elements. The protective layer is formed over the substrate so as to cover the plurality of lenses. The holding member is formed on the protective layer in a region outside the element formation region. The transparent member is fixed over the protective layer so that the holding member holds a bottom surface of the transparent member. The adhesive fills a gap between the protective layer and the transparent member.

The optical device of the present disclosure includes the holding member formed on the protective layer in the region outside the element formation region. Since the holding member holds the transparent member, the transparent member can be easily kept in parallel with the top surface of the protective layer. As a result, light properly enters the lenses, whereby a high image quality optical device can be easily implemented.

BRIEF DESCRIPTION OF THE DRAWINGS

FIGS. 1A and 1B show an optical device according to an embodiment of the present invention, wherein FIG. 1A is a plan view and FIG. 1B is a cross-sectional view taken along line Ib-Ib in FIG. 1A;

DETAILED DESCRIPTION OF THE PREFERRED EMBODIMENTS

Figure 1A:
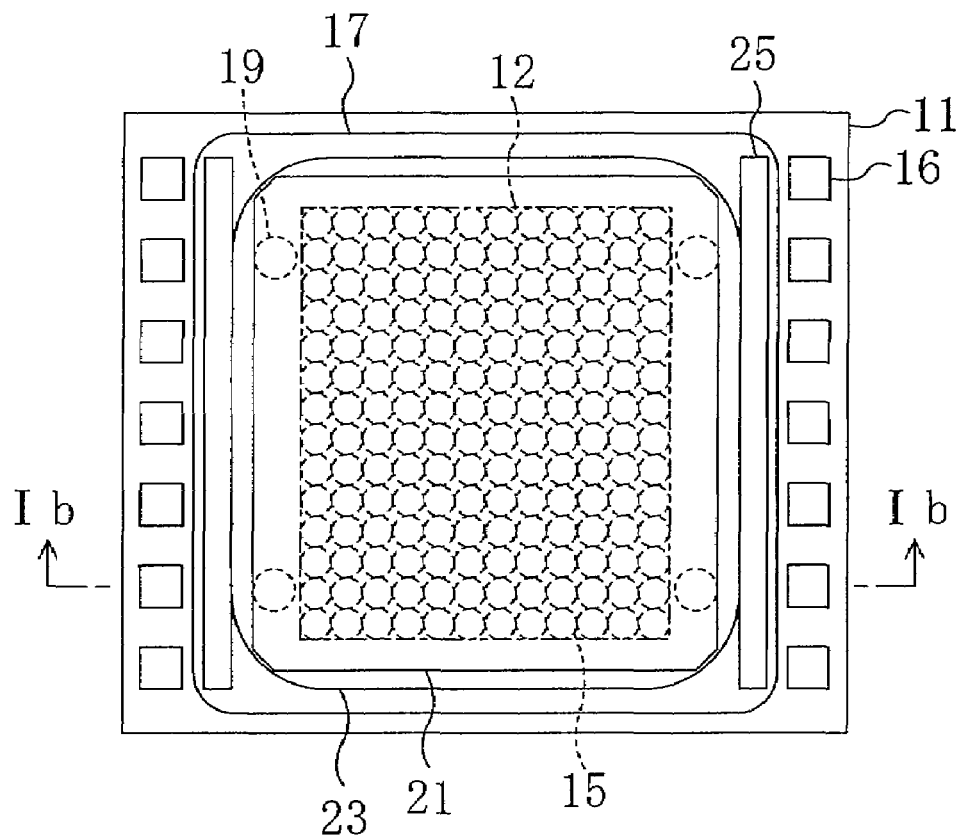
Figure 1B:
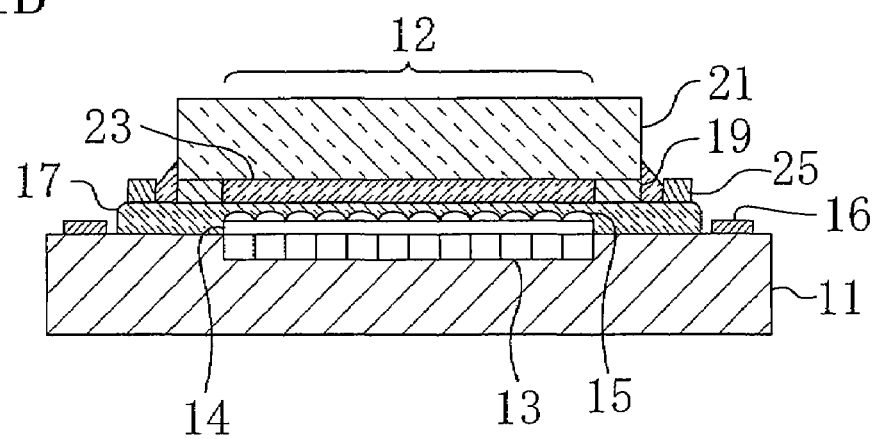

Hereinafter, an embodiment of the present invention will be described with reference to the accompanying drawings. FIGS. 1A and 1B show an optical device according to an embodiment of the present invention. FIG. 1A shows a planar structure and FIG. 1B shows a cross-sectional structure taken along line Ib-Ib in FIG. 1A.

As shown in FIGS. 1A and 1B, a plurality of optical elements 13 are formed in an element formation region 12 of a substrate 11. The substrate 11 is made of, for example, silicon. A plurality of lenses 15 corresponding to the plurality of optical elements 13 are formed over the element formation region 12. A planarizing layer 14 is formed between the substrate 11 and the lenses 15.

A protective layer 17 is formed over the substrate 11 so as to cover the lenses 15. Electrodes 16 are formed on the substrate 11 in a region outside a region covered by the protective layer 17. The protective layer 17 is formed by, for example, a spin coating process and photolithography. The top surface of the protective layer 17 can be easily and reliably made flat and in parallel with the lenses 15 by using the spin coating process and the photolithography.

Holding members 19 are formed on the protective layer 17 in a region outside the element formation region 12. In the example of FIGS. 1A and 1B, the holding members 19 have a columnar shape and are formed at four positions. The holding members 19 having the same height can be easily formed by a spin coating process and photolithography. Since the holding members 19 are formed in the region outside the element formation region 12 where the lenses 15 are formed, the holding members 19 do not prevent light from being incident on the lenses 15.

The holding members 19 support the bottom surface of a transparent member 21. Since the holding members 19 having the same height support the bottom surface at four positions, the top surface of the transparent member 21 can be easily made in parallel with the top surface of the protective layer 17. The transparent member 21 can be made of glass, quartz, a resin, or the like which is transparent to incident light.

The gap between the transparent member 21 and the protective layer 17 is filled with an adhesive 23, and the transparent member 21 is thus fixed over the protective layer 17. In the present embodiment, the four columnar holding members 19 are provided, and the adhesive 23 can therefore be uniformly applied under the transparent member 21. In the example of FIGS. 1A and 1B, the holding members 19 are arranged at locations other than the corners of the transparent member 21. This arrangement suppresses fine separation due to thermal expansion of the adhesive 23.

In the optical device of the present embodiment, barrier members 25 for preventing overflow of the adhesive 23 are provided on the protective layer 17 in a region outside the region covered by the transparent member 21. This structure prevents contamination of the surfaces of the electrodes 16 with the overflow adhesive 23 and thus prevents, for example, electrical connection work from being obstructed by the contamination.

Figure 2:
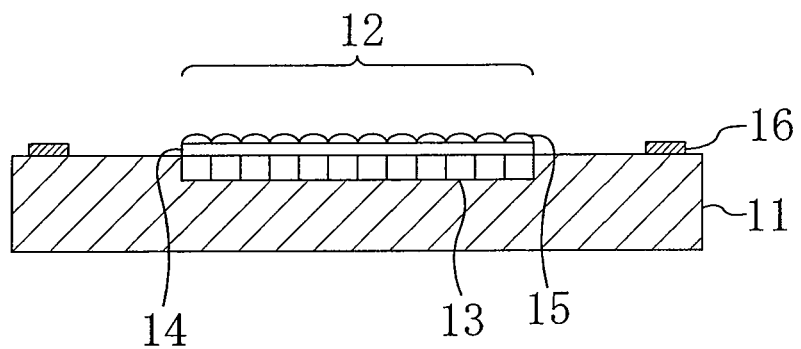
FIG. 2 is a cross-sectional view illustrating a step of a manufacturing method of the optical device according to the embodiment of the present invention.

Hereinafter, a method for manufacturing an optical device according to the present embodiment will be described with reference to the figures. As shown in FIG. 2, a plurality of optical elements 13 are first formed in an element formation region 12 of a substrate 11. A plurality of lenses 15 are then formed on the element formation region 12 with a planarizing layer 14 interposed therebetween. Electrodes 16 are formed on the substrate 11 in a region outside the element formation region 12.

Figure 3:
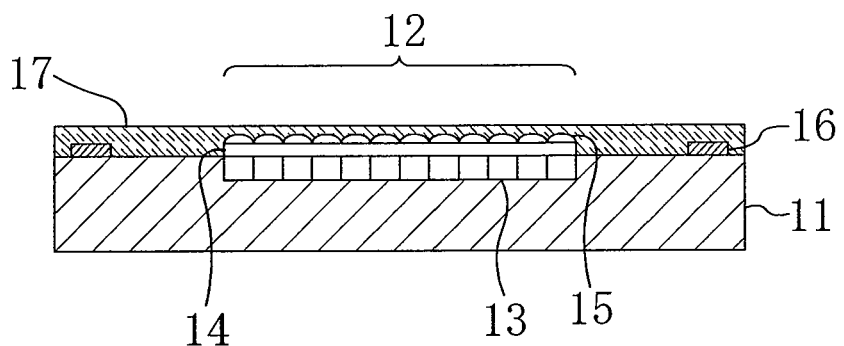
FIG. 3 is a cross-sectional view illustrating a step of the manufacturing method of the optical device according to the embodiment of the present invention.

As shown in FIG. 3, a protective layer 17 is formed over the whole surface of the substrate 11. The protective layer 17 is made of, for example, a fluorine-containing resin. The protective film 17 having a flat top surface and a uniform thickness can be formed by using a spin coating process. The protective layer 17 preferably has a low refractive index, and may be made of an inorganic material instead of the fluorine-containing resin.

Figure 4:
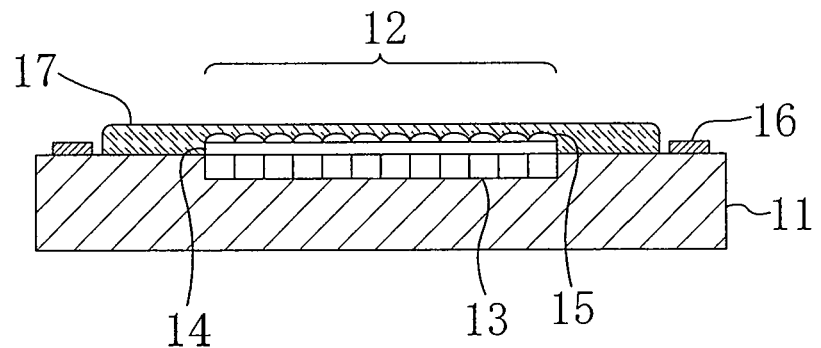
FIG. 4 is a cross-sectional view illustrating a step of the manufacturing method of the optical device according to the embodiment of the present invention.

As shown in FIG. 4, a part of the protective layer 17 which covers the electrodes 16 is then removed by photolithography.

Figure 5:
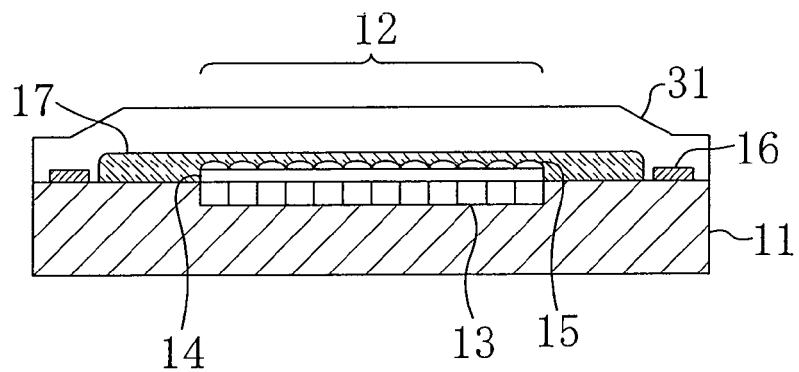
FIG. 5 is a cross-sectional view illustrating a step of the manufacturing method of the optical device according to the embodiment of the present invention.

As shown in FIG. 5, a resin layer 31, which will later serve as holding members and barrier members, is then formed over the whole surface of the substrate 11 by a spin coating process. The resin layer 31 having a flat top surface and a uniform thickness can be easily formed on the protective layer 17 by using the spin coating process. The resin layer 31 can be made of, for example, an epoxy resin.

Figure 6:
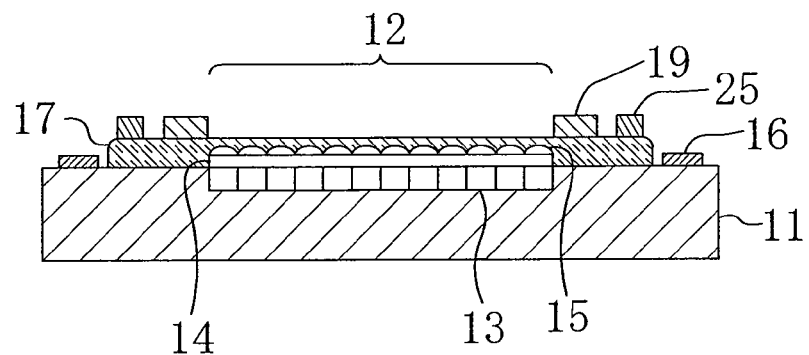
FIG. 6 is a cross-sectional view illustrating a step of the manufacturing method of the optical device according to the embodiment of the present invention.

As shown in FIG. 6, the resin layer 31 is then selectively removed by photolithography to form the holding members 19 and the barrier members 25. Note that the resin layer 31 may be made of a photosensitive resin such as an acrylic resin. In this case, the resin layer 31 can be exposed and developed to form the holding members 19 and the barrier members 25.

Figure 7:
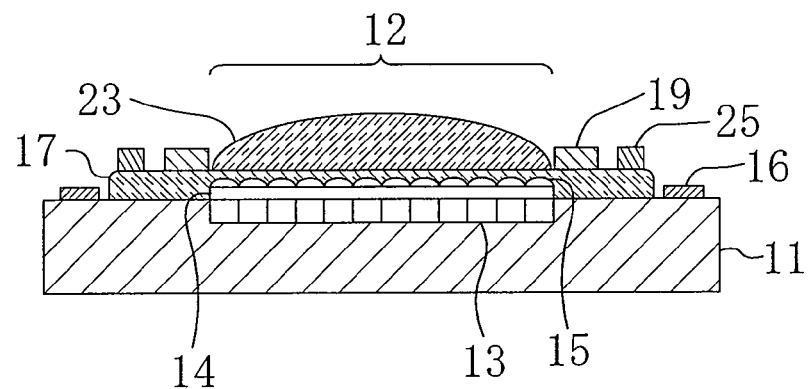
FIG. 7 is a cross-sectional view illustrating a step of the manufacturing method of the optical device according to the embodiment of the present invention.

As shown in FIG. 7, a predetermined amount of an uncured adhesive 23 is then applied to a region inside the holding members 19 on the protective layer 17.

Figure 8:
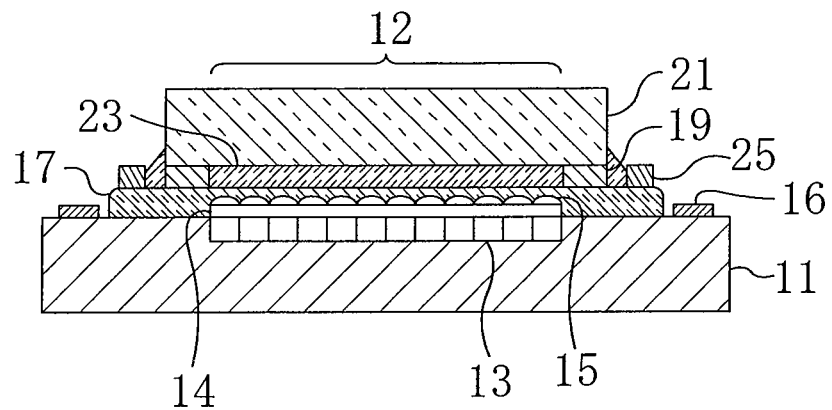
FIG. 8 is a cross-sectional view illustrating a step of the manufacturing method of the optical device according to the embodiment of the present invention.

As shown in FIG. 8, the transparent member 21 is pressed over the protective layer 17 so as to spread the uncured adhesive 23, so that the bottom surface of the transparent member 21 is supported by the top surfaces of the holding members 19. At the same time, the gap between the transparent member 21 and the protective layer 17 is uniformly filled with the adhesive 23. An excessive adhesive 23 overflows the edge of the transparent member 21 but does not overflow the barrier members 25 onto the electrodes 16. For example, an acrylic resin can be used as the adhesive 23.

The adhesive 23 is then cured, whereby fixing of the transparent member 21 is completed. Any curing method can be used according to the type of the adhesive.

In the case where an uncured adhesive is directly applied to the lenses and is spread by the transparent member, the resultant adhesive has an uneven thickness and therefore has an uneven surface. As a result, the top surface of the transparent member is tilted, and the resultant optical device may have poor image quality. The optical device of the present embodiment, on the other hand, has the holding members 19 for holding the transparent member 21 from beneath. The holding members 19 are not formed directly on the lenses. Instead, the flat protective layer 17 is first formed on the lenses and the holding members 19 are formed on the top surface of the protective layer 17. The holding members 19 themselves are therefore rarely tilted, and the top surface of the transparent member 21 held by the holding members 19 is rarely tilted accordingly. Formation of the flat protective layer 17 and the holding members 19 also enables the uncured adhesive 23 to be spread into a uniform thickness when the transparent member 21 is pressed over the protective layer 17. Accordingly, the top surface of the transparent member 21 will not be tilted with respect to the top surface of the protective layer 17 due to an uneven thickness of the adhesive 23. The transparent member 21 can therefore be easily made in parallel with the lenses 15 and thus the image quality is less likely to be degraded. Moreover, since the top surface of the transparent member 21 can be used as a reference plane of the optical device, the optical device can be mounted easily and accurately.

Since a spin coating process is used to form the protective layer 17 and the holding members 19, the respective top surfaces of the protective layer 17 and the holding members 19 can be easily made flat and in parallel with the lenses 15.

Figure 9:
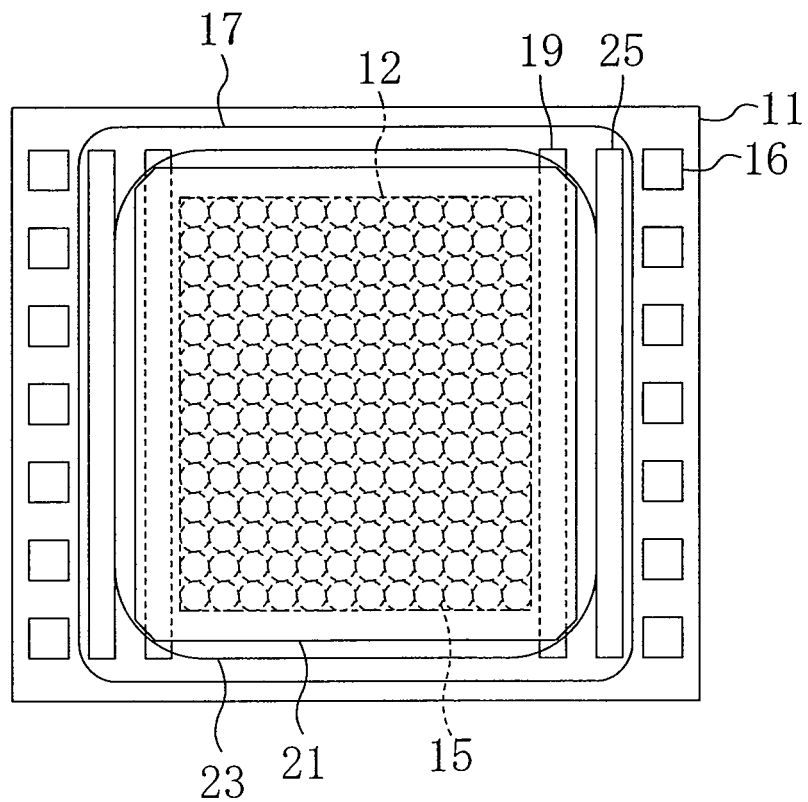
FIG. 9 is a cross-sectional view of a modification of the optical device according to the embodiment of the present invention.

The holding members 19 have a columnar shape in the present embodiment. However, the holding members 19 may have any shape as long as the holding members 19 can stably hold the transparent member 21. As shown in FIG. 9, two strip-shaped holding members 19 may be arranged in parallel with each other. In this case, the holding members 19 can stably hold the transparent member 21 when arranged on both side of the element formation region 12. The holding members 19 and the barrier members 25 are simultaneously formed in the above example. However, the holding members 19 and the barrier members 25 may be formed in separate steps. The barrier member 25 is preferably located at least on each side where the electrodes 16 are formed. However, the barrier member 25 may surround the four sides.

Figure 10:
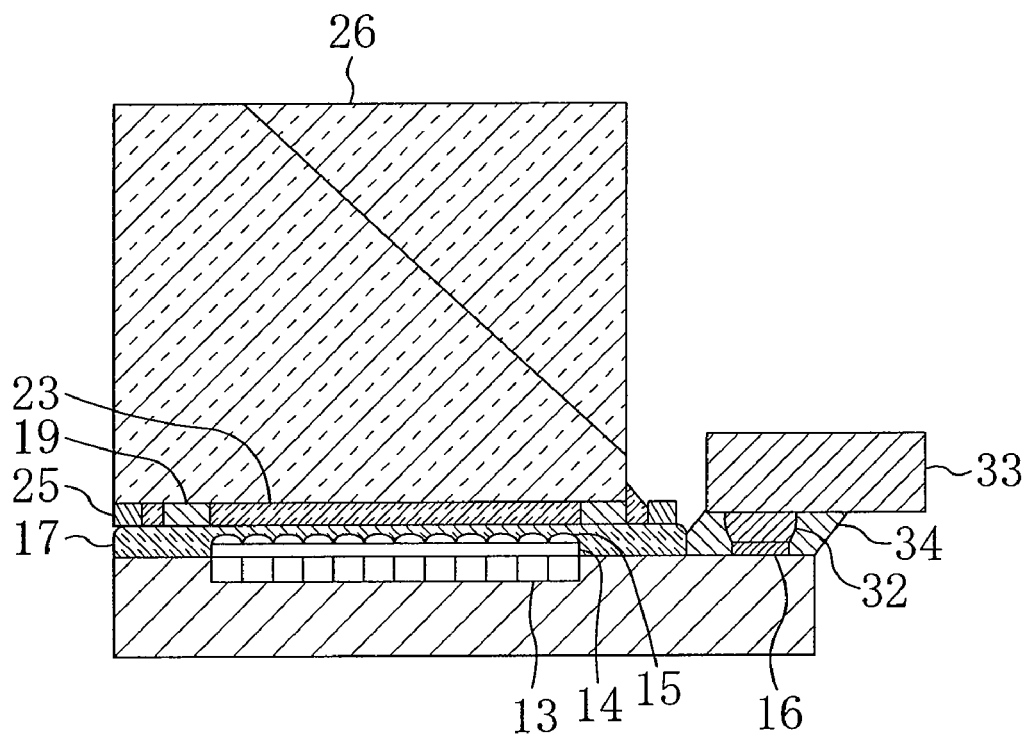
FIG. 10 is a cross-sectional view of another modification of the optical device according to the embodiment of the present invention.

As shown in FIG. 10, the transparent member 21 may be a prism 26. In this case, the prism 26 needs to be fixed more accurately, and formation of the holding members 19 is therefore more effective. Formation of the holding members 19 also reduces the contact area, whereby alignment for bonding the prism 26 can be easily performed. The prism 26 can therefore be bonded while examining the position on the image.

For example, the electrodes 16 may be electrically connected to a circuit board 33 through bump electrodes 32, as shown in FIG. 10. The electric connection state can be stabilized by fixing the circuit board 33 and the substrate 11 with a fixing resin 34.

As has been described above, a high image quality optical device whose transparent member is less likely to be tilted can be implemented by the optical device and the manufacturing method thereof according to the present disclosure. The optical device and the manufacturing method thereof according to the present disclosure are especially useful as an optical element used in, for example, a digital camera, a manufacturing method thereof, and the like.

The description of the embodiments of the present invention is given above for the understanding of the present invention. It will be understood that the invention is not limited to the particular embodiments described herein, but is capable of various modifications, rearrangements, and substitutions as will now become apparent to those skilled in the art without departing from the scope of the invention. Therefore, it is intended that the following claims cover all such modifications and changes as fall within the true spirit and scope of the invention.

What is claimed is:

1. An optical device, comprising:
a substrate;
a plurality of optical elements formed in an element formation region of the substrate;
a plurality of lenses formed over the element formation region so as to correspond to the plurality of optical elements;
a protective layer formed over the substrate so as to cover the plurality of lenses;
a holding member formed on the protective layer in a region outside the element formation region;
a transparent member fixed over the protective layer so that the holding member holds a bottom surface of the transparent member; and
an adhesive filling a gap between the protective layer and the transparent member.

2. The optical device of claim 1, wherein multiple ones of the holding member are provided at regular intervals.

3. The optical device of claim 2, wherein the holding members have a columnar shape.

4. The optical device of claim 1, wherein
the transparent member has a rectangular planar shape, and
the holding member is positioned so as to hold the transparent member except corners thereof.

5. The optical device of claim 1, wherein the holding member is provided on both sides of the element formation region.

6. The optical device of claim 1, further comprising:
a barrier member formed on the protective layer in a region outside a region covered by the transparent member.

7. The optical device of claim 6, wherein the barrier member has a rectangular planar shape.

8. The optical device of claim 1, further comprising:
an electrode formed on the substrate in a region outside a region covered by the protective layer.

9. The optical device of claim 1, wherein the transparent member is a prism.

10. A method for manufacturing an optical device, comprising the steps of:
(a) forming a plurality of optical elements and a plurality of lenses corresponding to the optical elements in an element formation region of a substrate;
(b) forming a protective layer over the substrate so as to cover the plurality of lenses;
(c) forming a holding member on the protective layer in a region outside the element formation region; and
(d) fixing a transparent member over the protective layer so that the holding member holds a bottom surface of the transparent member.

11. The method of claim 10, wherein
the step (d) includes the steps of:
applying an uncured adhesive to a top surface of the protective layer in a region between multiple ones of the holding member, and
pressing the transparent member so as to fill an entire gap between the bottom surface of the transparent member and the top surface of the protective layer with the uncured adhesive and to bring the bottom surface of the transparent member into contact with a top surface of the holding member.

12. The method of claim 10, wherein, in the step (c), the holding member is formed by a spin coating process.

13. The method of claim 10, wherein, in the step (c), the holding member is formed by applying a photosensitive resin on a top surface of the protective layer and exposing and developing the photosensitive resin.

14. The method of claim 10, further comprising the step of:
(e), before the step (d), forming a barrier member for preventing overflow of the adhesive on a top surface of the protective layer in a region outside a region covered by the transparent member.

15. The method of claim 14, wherein the steps (c) and (e) are performed simultaneously.

* * * * *